United States Patent
Qiu et al.

(10) Patent No.: US 8,085,407 B2
(45) Date of Patent: Dec. 27, 2011

(54) RESONATOR OPTICAL GYROSCOPE HAVING INPUT BEAM MODULATION OPTIMIZED FOR HIGH SENSITIVITY AND LOW BIAS

(75) Inventors: Tiequn Qiu, Glendale, AZ (US); Glen A. Sanders, Scottsdale, AZ (US); Lee Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 273 days.

(21) Appl. No.: 12/540,175

(22) Filed: Aug. 12, 2009

(65) Prior Publication Data

US 2011/0037985 A1  Feb. 17, 2011

(51) Int. Cl.
*G01C 19/72* (2006.01)

(52) U.S. Cl. .................. 356/461; 356/459; 356/460

(58) Field of Classification Search .......... 356/459–461, 356/472, 476; 385/12; 382/149
See application file for complete search history.

(56) References Cited

U.S. PATENT DOCUMENTS

| | | | |
|---|---|---|---|
| 5,296,912 A * | 3/1994 | Strandjord et al. | 356/461 |
| 5,469,257 A | 11/1995 | Blake et al. | |
| 5,781,300 A * | 7/1998 | Strandjord et al. | 356/460 |
| 6,175,410 B1 | 1/2001 | Szafraniec et al. | |
| 7,777,889 B2 * | 8/2010 | Qiu et al. | 356/460 |

OTHER PUBLICATIONS

European Patent Office, "European Search Report", Apr. 7, 2011, Published in: EP.

* cited by examiner

*Primary Examiner* — Tarifur Chowdhury
*Assistant Examiner* — Michael P LaPage
(74) *Attorney, Agent, or Firm* — Fogg & Powers LLC

(57) ABSTRACT

Systems and methods for optimizing input beam modulation for high gyro sensitivity and low bias errors. The present invention is a resonator optical gyroscope having an optimized phase-modulation amplitude (frequency) for a selected modulation frequency (amplitude) that maximizes the gyro signal-to-noise (S/N) sensitivity. For selected values of the phase modulation amplitude, the polarization cross-coupling induced intensity modulation can be nulled. By setting the phase modulation amplitudes substantially close to these nulling points (e.g. M=3.832 or 7.016 radians, which causes the first order Bessel function to be zero $J_1(M)=0$) and then optimizing the modulation frequency, the intensity modulation induced bias is reduced to zero and gyro S/N sensitivity is maximized.

8 Claims, 6 Drawing Sheets

RESONATOR OPTICAL GYROSCOPE HAVING INPUT BEAM MODULATION OPTIMIZED FOR HIGH SENSITIVITY AND LOW BIAS

BACKGROUND OF THE INVENTION

A resonator optical gyroscope is a rotation rate sensing device that includes a resonant cavity. The resonant cavity supports light waves propagating in opposite directions (without loss of generality, they are referred in the following to clockwise (CW) and counter-clockwise (CCW) directions, respectively). When there is a non-zero rotation rate around the normal axis of the resonator, the effective optical round-trip path length for the CW and CCW lightwaves is different, leading to a resonant frequency difference between them. By measuring this resonant frequency difference, rotation rate can be determined.

Resonator fiber optic gyroscope (RFOG) is a special kind of resonator gyroscope that uses optical fibers in the resonator. Optical fiber increases the gyro signal-to-noise (S/N) sensitivity without significantly increasing the size of the sensing loop. For measuring the resonant frequency difference, monochromatic light waves are typically sinusoidally phase/frequency modulated and coupled into the RFOG resonator in the CW and CCW directions. Fractions of light circulating inside the resonator are coupled out of the resonator and converted to electronic signals at photodetectors. The electrical signals are demodulated at the corresponding modulation frequencies and used to servo the input light frequencies to the resonance frequencies of the CW and CCW cavity.

Along the optical path before and after the RFOG's phase modulator, there can be polarization cross-couplings points due to imperfect fiber splices or polarization axis mismatch between the modulator waveguide and its pigtail fibers (not shown). In this case, the phase modulation behaves like a Mach-Zehnder interferometer with its two optical arms formed by the two orthogonal polarization paths of the modulator. Most of the optical power propagates in the optical path whose polarization state is aligned with the pass-axis of the modulator. A small amount of (cross-coupled) optical power propagates in the optical path whose polarization state is orthogonal to the pass-axis of the modulator. At a cross-coupling point after the phase modulator, the interferences between the light waves propagating along the two orthogonal polarization axes of the modulator causes intensity modulation at the phase modulation frequency, leading to erroneous demodulation of the rate signals. Erroneous demodulation generates bias errors of the gyro.

Ways to reduce this modulator induced intensity modulation are through selection of phase modulators with high polarization extinction ratio (PER) and reduction of polarization cross-couplings in the gyro optical path. These require high performance modulators and increase production complexity and cost. An unobvious but clever way to solve the problem is to proper select the phase modulation amplitude (to be detailed in this invention). Care must be taken in this method because change of phase modulation amplitude affects the gyros S/N sensitivity (which determines how fine a rotation rate can be measured). It is necessary to find a way that simultaneously reduces the bias error and maximizes the gyro S/N sensitivity.

SUMMARY OF THE INVENTION

The present invention provides methods and systems to achieve high gyro signal-to-noise (S/N) sensitivity and low intensity modulation by optimizing input beam phase modulation amplitudes and frequencies. In one embodiment of the invention, a single modulation amplitude/frequency selection simultaneously optimizes the gyro for both highest S/N sensitivity and lowest modulator induced intensity modulation. In a further embodiment, a method to optimize the phase-modulation amplitude (frequency) for a selected modulation frequency (amplitude) that maximizes the gyro S/N sensitivity is provided.

More specifically, when the phase modulation amplitude is at certain values, the polarization cross-coupling induced intensity modulation can be nulled. By first setting the phase modulation amplitudes substantially close to these null points, e.g. M=3.832 or 7.016 radians (which causes the first order Bessel function to be zero $J_1(M)=0$), then optimizing the modulation frequency, the intensity modulation can be reduced to nearly zero while still achieving maximum gyro S/N sensitivity. Selection of different (but substantially close to optimal sensitivity) modulation frequencies for CW and CCW input lightwaves avoids bias instabilities due to backscattering in the gyro sensing loop.

BRIEF DESCRIPTION OF THE DRAWINGS

Preferred and alternative embodiments of the present invention are described in detail below with reference to the following drawings.

DETAILED DESCRIPTION OF THE INVENTION

Reducing gyro bias errors and increasing gyro sensitivity is important to applications in many fields. The present invention provides methods and systems that optimize the input light modulations to simultaneously reduce bias errors and maximize sensitivity. It should be understood that resonator gyros can be constructed from many kinds of optical components (including those with optical fibers, optical waveguides, discrete optical components and free space, etc). In addition, the invention is applicable to gyros with multiple input light beams from one or multiple light sources in both CW and CCW directions.

Figure 1:
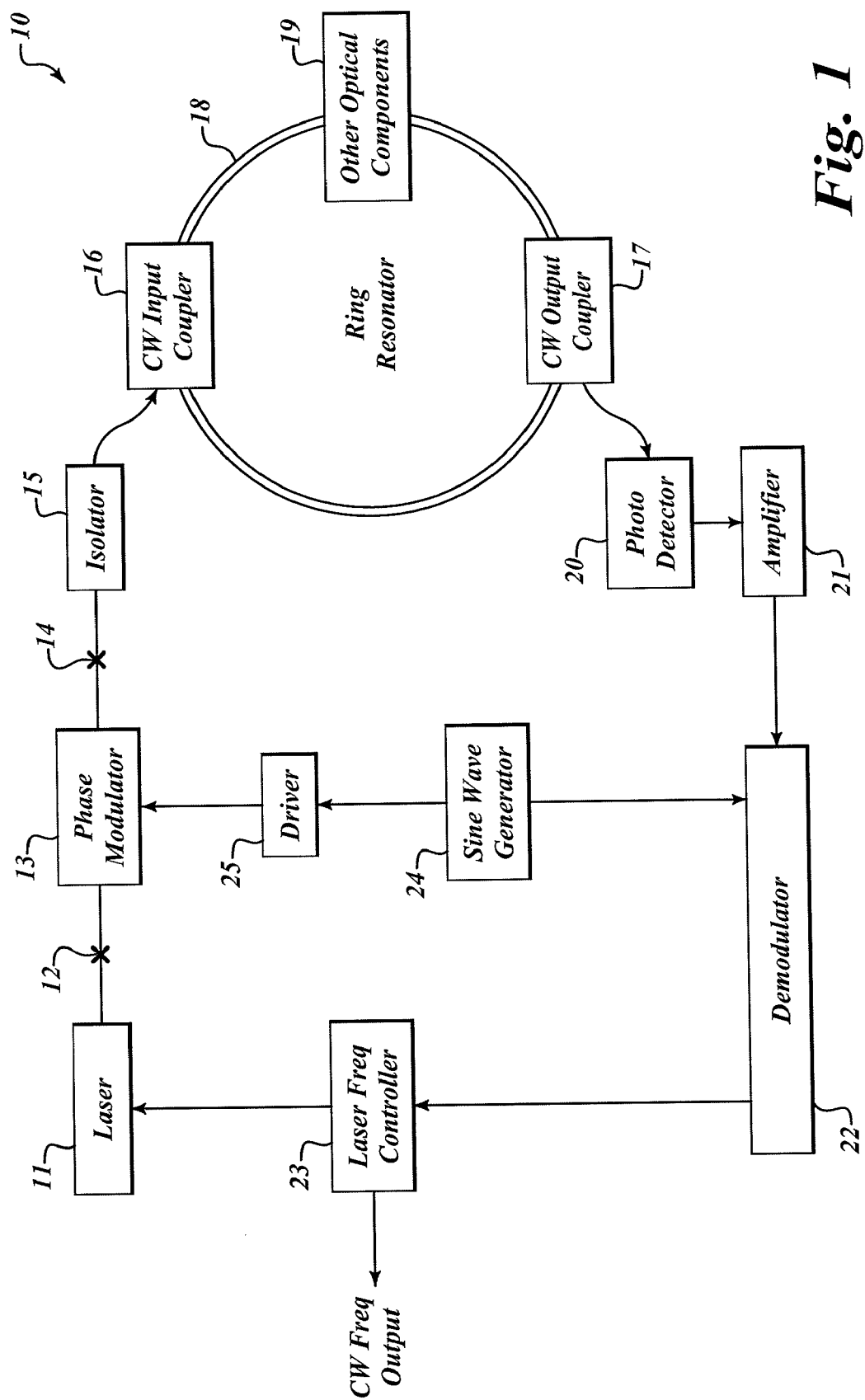
FIG. 1 is a schematic view of a resonator optical gyroscope formed in accordance with an embodiment of the present invention.

FIG. 1 shows a high sensitivity, low bias resonator optical gyroscope 10 (typically a resonator fiber optic gyroscope (RFOG)) with functional blocks for input light modulation, output signal detection, demodulation and servo electronics. The RFOG 10 includes a monochromatic light source 11, an input polarization cross-coupling point 12, a phase modulator 13, an output polarization cross-coupling point 14, an optical isolator 15, an input coupler 16, an output coupler 17, a resonator 18, other optical components 19, a photo detector 20, an amplifier 21, a demodulator 22, a laser frequency controller 23, a sine wave generator 24, and a driver 25. For simplicity, components related only to the clockwise (CW) light waves are shown. The counterclockwise (CCW) components are omitted but assumed substantially the same as their CW counterparts.

An output beam from the monochromatic light source 11 is phase-modulated by the phase modulator 13 and coupled into the resonator 18 in the CW direction at the input coupler 16. The optical isolator 15 is located between the coupler 16 and the modulator 13 to prevent any counter-propagating lightwaves (not shown) from returning to the monochromatic light source 11. A fraction of the circulating CW lightwaves are coupled out of the resonator 18 at the output coupler 17 and detected by the photo detector 20. A photo-current or voltage signal is amplified by the amplifier 21 and fed to the demodulator 22 for demodulation and processing. The sine wave generator 24 used to drive the phase-modulator 13 provides a reference frequency to the demodulator 22. A demodulated signal is used by the servo electronics to lock the laser frequency to the resonances of the CW resonator 18. A measured resonant frequency difference between the CW and CCW (similarly measured) directions determines the rotation rate.

As shown in FIG. 1, the points 12 and 14 generally represent points of polarization cross-coupling before and after the phase modulator 13 due to imperfect phase modulator fiber splices or polarization axis mismatch between the modulator waveguide and its pigtail fibers (not shown). The polarization cross-coupling at points 12 and 14 lead to light intensity modulation at the phase modulation frequency due to interference between the lightwaves propagating along the two orthogonal polarization axes of the modulator. This intensity modulation occurring at the phase modulator 13 causes erroneous demodulation of the rate signal and produce bias errors of the gyro.

To find the dependence of RFOG sensitivity and bias error on input light modulation parameters, a mathematical analysis of the RFOG modulation and demodulation output of the typical RFOG of FIG. 1 is presented below. Since the present invention is focused on optimizing input light modulation, it is assumed that the resonator only supports one polarization mode and one spatial mode for simplicity in mathematical expressions. The input light beam that experienced sinusoidal phase modulation of $\Phi_m = M \sin \omega_m t$ and polarization cross-coupling is expressed as:

$$E_{in}(t) = \frac{1}{2} E_0 e^{i\theta(t)} \exp(i\omega_c t) k_1 k_2 \varepsilon e^{i\phi_T(t)} + \tag{1}$$
$$\frac{1}{2} E_0 e^{i\theta(t)} \exp(i\omega_c t) \exp(iM \sin\omega_m t) + c.c.$$

where the first term on the right hand side of the equation is related to polarization cross-coupling induced field and the second term is the modulated main light beam. $E_0$ is the input light beam amplitude, $\theta(t)$ is the initial phase of the lightwave at time t, $\omega_c$ is the lightwave center angular frequency (hereinafter, all angular frequencies will be referred to as frequencies for simplicity), $\omega_m$ is the phase modulation frequency, M is the phase modulation amplitude in units of radians, and c.c. stands for complex conjugation. $k_1$ and $k_2$ are the polarization amplitude cross-coupling coefficients at the points 12 and 14 respectively, E is the phase modulator field polarization extinction ratio. For phase modulators with high polarization extinction ratios and small cross-coupling amplitudes, $k_1$, $k_2$, and $\varepsilon$ are very small numbers. However, the impact of the first term on bias cannot be ignored for high performance gyros or when $k_1 k_2 \varepsilon$ is not small enough (e.g. $>10^{-6}$). In the equation, the term $\phi_T(t)$ is the phase difference between the two light paths having orthogonal polarization states between the cross-coupling points 12 and 14. This phase difference varies with time upon environmental changes and is the cause of bias instability when cross-couplings are present.

The instantaneous frequency of the modulated light is obtained by differentiating its phase with time, which is $\omega(t) = \omega_c + M\omega_m \cos \omega_m t$. Sinusoidal phase modulation with frequency of $\omega_m$ and amplitude of M radians is equivalent to a sinusoidal frequency modulation with frequency amplitude of $M \cdot f_m$ Hz. So "phase modulation" and "frequency modulation" may be referring to the same modulation, but can be expressed in different units in the following statements.

Using the relation of $$\exp(iz\sin x) = \sum_{n=-\infty}^{\infty} J_n(z)\exp(inx),$$

Eq. (1) can be expanded in terms of Bessel functions $J_n$ $$E_{in}(t) = \frac{1}{2} E_0 e^{i\theta(t)} \exp(i\omega_c t) k_1 k_2 \varepsilon e^{i\phi_T(t)} + \tag{2}$$
$$\frac{1}{2} E_0 e^{i\theta(t)} \sum_{n=-\infty}^{\infty} J_n(M)\exp(i(\omega_c + n\omega_m)t) + c.c.$$

where n is an integer number range from $-\infty$ to $+\infty$. The above equation shows that the field of the modulated light contains many frequency components shifted from $\omega_c$ by integer numbers of the modulation frequency $\omega_m$. The magnitude of the frequency components are governed by the phase modulation amplitude M and the Bessel functions. The polarization cross-coupled light beam expressed by the first term of the equation contributes only to the fundamental frequency component at $\omega_c$, therefore its complex magnitude is proportional to $J_0(M) + k_1 k_2 \varepsilon e^{i\Phi(t)}$ instead of $J_0(M)$.

To calculate the optical field at the photodetector 20, multiple light beams from different numbers of round-trips of the cavity have to be summed. The total electric field $E_p$, at frequency $\omega_c + p\omega_m$ is a superposition of all the fields whose complex amplitudes are attenuated by the optical path losses which depend on the number of round-trips experienced before being coupled out of the resonator and by the resonator round-trip field transmission coefficient $\rho$.

$$E_p = \frac{E_0}{2} J_p(M)\exp[i(\omega_c + p\omega_m)t] \tag{3}$$
$$\sum_{n=0}^{\infty} \rho^n \exp[-i(\omega_c + p\omega_m)n\tau]\exp[i\theta(t - n\tau)]$$

The beat of the total field between frequency components $\omega_c+p\omega_m$ and $\omega_c+q\omega_m$ (for p, q≠0) produces an electric signal at frequency of $(p-q)\omega_m$ whose intensity is proportional to $$B_{pq} = \begin{bmatrix} J_p(M)\exp(i(\omega_c + p\omega_m)t) \\ \sum_{n=0}^{\infty} \rho^n \exp(-i(\omega_c + p\omega_m)n\tau)\exp[i\theta(t-n\tau)] \end{bmatrix}$$
$$\begin{bmatrix} J_q^*(M)\exp(-i(\omega_c + p\omega_m)t) \\ \sum_{m=0}^{\infty} \rho^{*m} \exp(i(\omega_c + p\omega_m)m\tau)\exp[-i\theta(t-m\tau)] \end{bmatrix}$$
$$= \frac{J_p(M)J_q^*(M)e^{i(p-q)\omega_m t}}{(1-\rho e^{-i(\omega_c+p\omega_m)\tau}e^{-2\pi\Delta\nu\tau})(1-\rho^* e^{i(\omega_c+q\omega_m)\tau}e^{-2\pi\Delta\nu\tau})} \quad (4)$$

where $\Delta\nu$ is the laser line width and $\tau$ is the resonator round-trip time. For the signal involving beat with the fundamental frequency field, the corresponding Bessel function $J_0(M)$ in the nominator of Equation (4) is replaced with $J_0(M)+k_1k_2\epsilon e^{i\Phi(t)}$ in order to take into account contributions from the polarization cross-couplings.

To measure the RFOG resonance frequency, the first harmonic beat signal is of particular interest. Summation of $B_{pq}$ with all the p and q that satisfy the condition p−q=±1 that produces the first harmonic signal magnitude, which is a function of phase modulation amplitude M, modulation frequency $\omega_m$, resonator round-trip field transmission coefficient $\rho$, laser line width $\Delta\nu$, and cavity round-trip time $\tau$, etc. The dependence of the demodulated first harmonic signal amplitude on the modulation amplitude M and modulation frequency $\omega_m$, is used to optimize input light modulations for high sensitivity and low bias errors.

For an ideal RFOG without polarization cross-coupling and related modulation imperfections, the demodulated first harmonic signal becomes zero when the laser frequency is tuned to the cavity resonant frequencies. The servo electronics use this discriminant-characteristic to lock the laser to the resonances and find the frequency difference between CW and CCW beam for rotation rate measurement. The slope of the first harmonic signal versus laser frequency detuning from the resonance determines the RFOG signal-to-noise ratio (S/N). A larger slope gives higher S/N because small frequency deviations from the resonance can produce large first harmonic signals. The gyro's S/N sensitivity can be optimized once its dependence on light modulation amplitude and frequency is found analytically.

When there is an undesired electric wave amplitude due to non-zero polarization cross-coupling, i.e., $k_1k_2\epsilon \neq 0$, the demodulated first harmonic signal has a non-zero value (e.g. nonzero voltages, if photodetector preamp voltage signals are used), even at each of the resonant frequency centers. If the gyro servo electronics still use the zero signal value to determine the resonance frequencies, a bias error (non-zero output with zero rotation rate) will exist in the gyro output. From the analysis, the magnitude of this bias error also depends on the phase modulation amplitude. For certain modulation amplitudes, it is possible to reduce this error to zero even when polarization cross-coupling is present, i.e., $k_1k_2\epsilon \neq 0$.

To simulate the dependence of RFOG bias and sensitivity performance on input light modulation, a mathematical model is used. The mathematical model is based on the above described principles and equations, and exists in the form of code in a computer program. In one embodiment, the computer program is implemented in the Matlab programming language, but in other embodiments the program could be implemented in other languages.

The code is divided into several sections. A first code section is for relating input data. In one embodiment, parameters, such as resonator fiber length, coil diameter, input/output coupling loss, laser linewidth, laser power, input light phase modulation amplitude and modulation frequency, and magnitude of polarization cross-coupling, etc., are specified in this section. A second code section calculates a simulated response of a demodulated signal at a given modulation frequency $\omega_m$. Equation (4) is an expression for signal intensity at frequency of $(p-q)\omega_m$ generated from a beat between frequency components $\omega_c+p\omega_m$ and $\omega_c+q\omega_m$ (for p,q≠0). To calculate the demodulated signal at $\omega_m$, summation of $B_{pq}$ with all the p and q that satisfy condition p−q=±1 is needed. For the signal involving the beat with a fundamental frequency field (i.e. p, or q=0), the corresponding Bessel function $J_0$ (M) in the nominator of Equation (4) is replaced with $J_0(M)+k_1k_2\epsilon e^{i\Phi(t)}$ to take into account effects of polarization cross-coupling. Since the contributions from higher order Bessel terms $J_n(M)$ decreases with increasing number of n, the summation can be limited to a finite number of terms. A third code section plots the resulting demodulated signal as a function of the input parameters, such as input light modulation amplitude and modulation frequency. The mathematical model reduces the time needed to find optimal design of the RFOG 10 in terms of bias error and S/N sensitivity.

To illustrate the principles of this invention, the dependence of gyro S/N sensitivity and bias error are studied for an RFOG with exemplary parameters. The RFOG is assumed to have an effective cavity length of 15 meters, corresponding to a resonance frequency spectral range (FSR) of 20 MHz and a round trip time of 50 nanoseconds. The input coupler 16 and the output coupler 17 are assumed to have 95% intensity transmission coefficients for intra-cavity lightwaves and couple 5% of light into or out of the resonator. The resonator excess round-trip loss is 10% without taking into account the input/output coupling loss induced by the couplers. A 1550 nanometer laser has a linewidth of 50 kHz. The resonator coil diameter is 7.5 cm, corresponding to a scale factor of 4.26 deg/hr/Hz for converting frequency shifts in hertz to rotation rates in degrees per hour.

Figure 2:
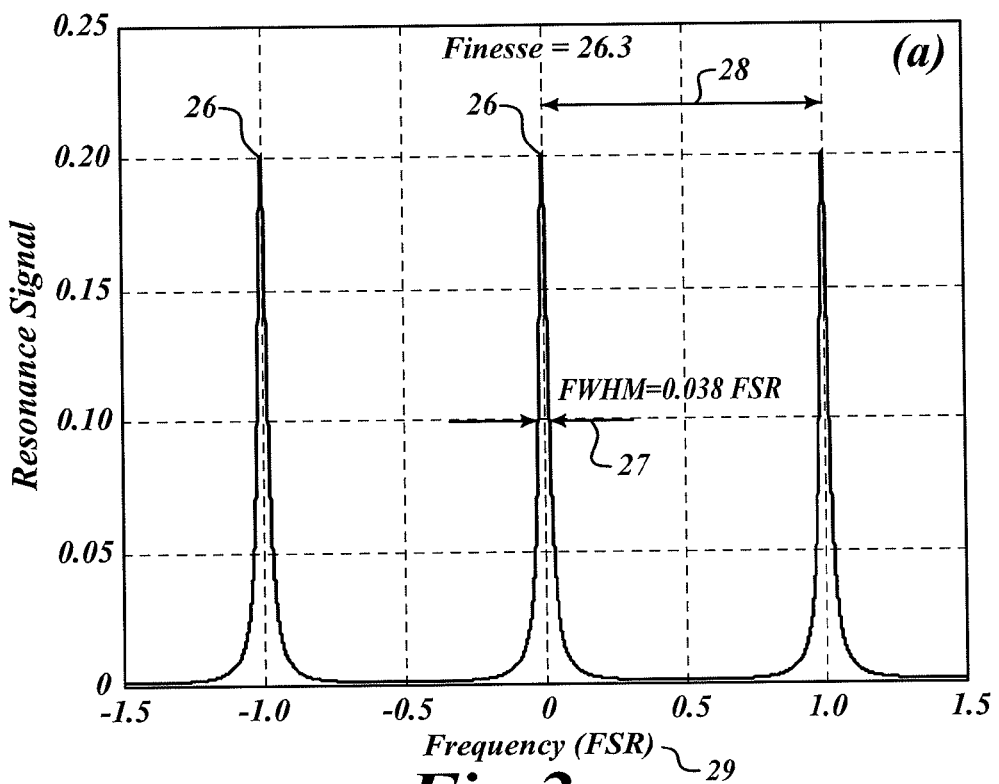
FIG. 2 is a plot of a resonance signal from the gyro of FIG. 1 as a function of detuning laser frequency.

FIG. 2 shows a resonance signal as the laser is scanned over a frequency range of about three free spectral ranges (FSRs) (from −1.5 to +1.5 FSR). As shown in FIG. 2, three resonance peaks 26 are shown for the assumed parameters above. A resonance full width at half maximum (FWHM) line width 27 is about 3.8% of a free spectral range (FSR) 28, which is the frequency separation of the two resonance peaks 26, corresponding to resonator finesse of 26.3.

Figure 3:
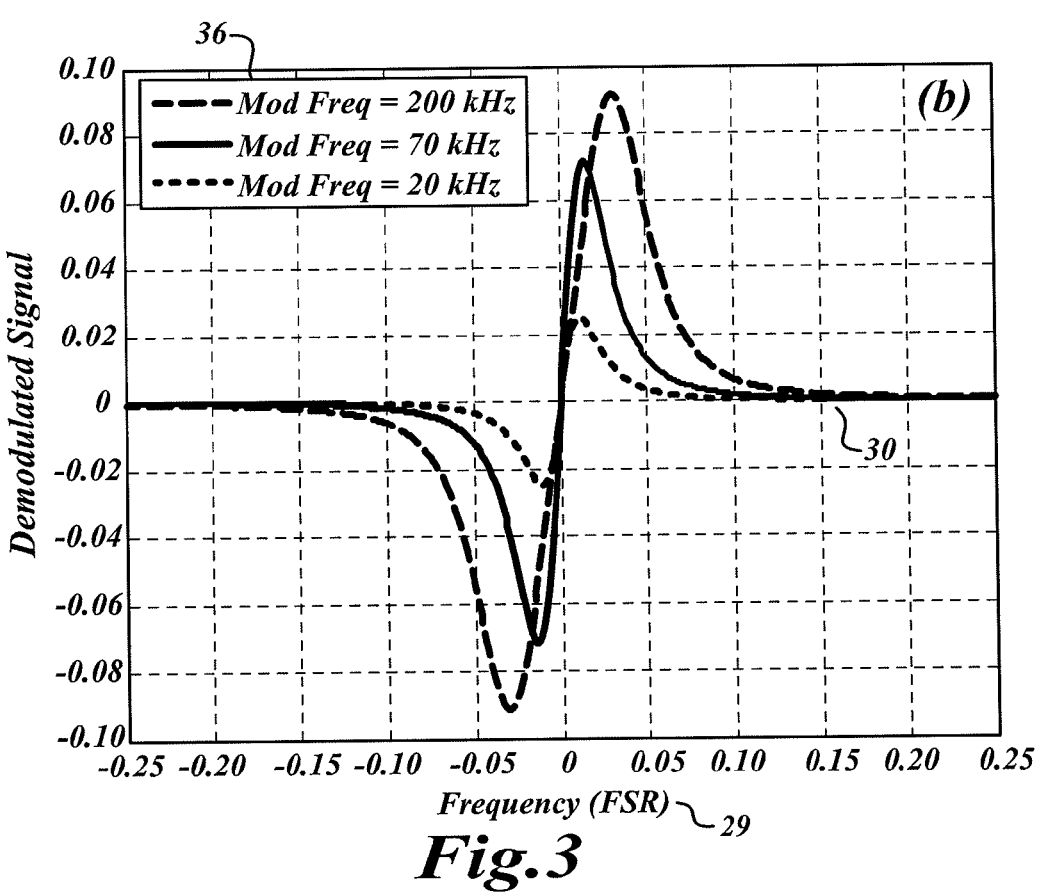
FIG. 3 is a plot of a demodulated signal corresponding to the resonance signal of the gyro of FIG. 1 as a function of the laser detuning frequency.

As shown in FIG. 3, a demodulated first harmonic signal 30 is shown as a function of laser detuned frequency from a resonance (in units of FSR, i.e. 20 MHz) 29 for several input light modulation frequencies (20, 70 and 200 kHz) 36, but at a fixed modulation amplitude. The slopes of the demodulated first harmonic signal 30 (i.e. the sensitivity) are different for different modulation frequencies. In the following, a normalized sensitivity is defined as the slope of this demodulated first harmonic signal 30 in units of intensity change (normalized to input light power) per MHz of laser frequency detuning from the resonance peak 26.

Figure 4:
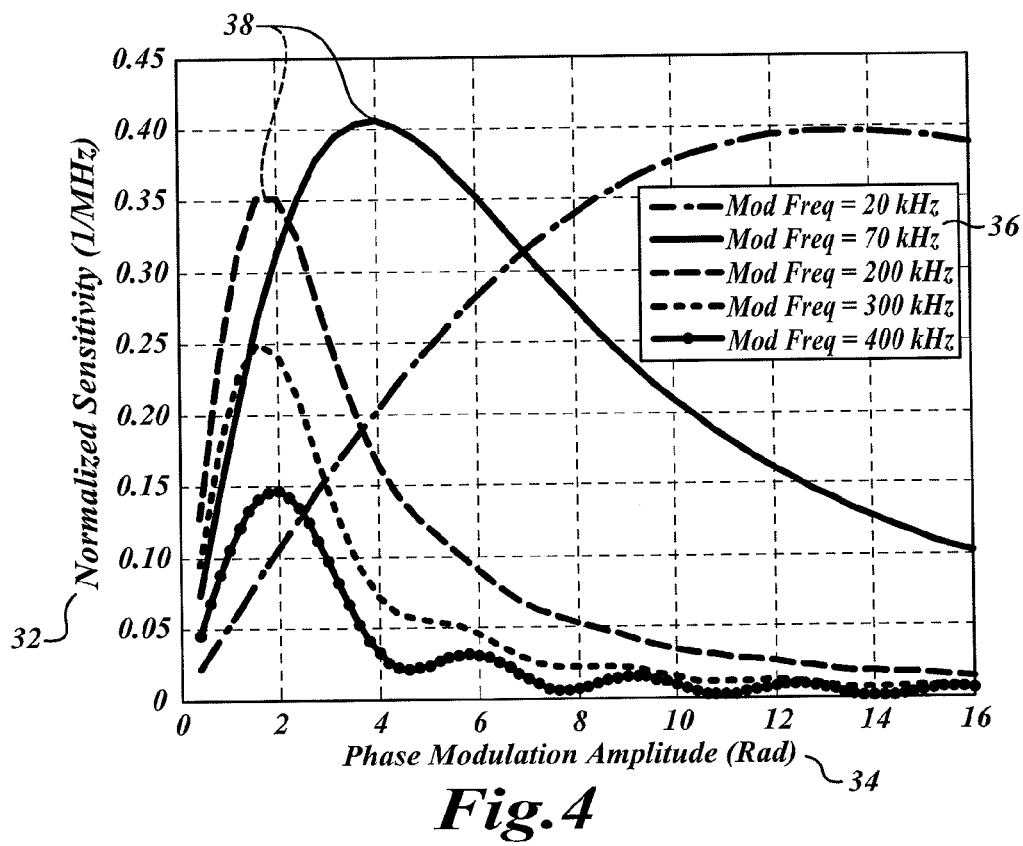
FIG. 4 is a plot of normalized S/N sensitivity for the gyro of FIG. 1 as a function of phase modulation amplitude in unit of radians for several modulation frequencies.

As shown in FIG. 4, the dependence of gyro sensitivity 32 is plotted as a function of phase modulation amplitude M 34 (in unit of radians) for several modulation frequencies 36, e.g. 20, 70, 200, 300 and 400 kHz. At each modulation frequency 36, there is the modulation amplitude 34 that maximizes the gyro sensitivity 32. For 20 kHz it is at 13 radians, for 70 kHz it is approximately 4 radians, and for 200, 300, and 400 kHz, it is approximately 2 radians. The plot shows that maximum achievable sensitivities 38 are different for different modulation frequencies 36.

Figure 5:
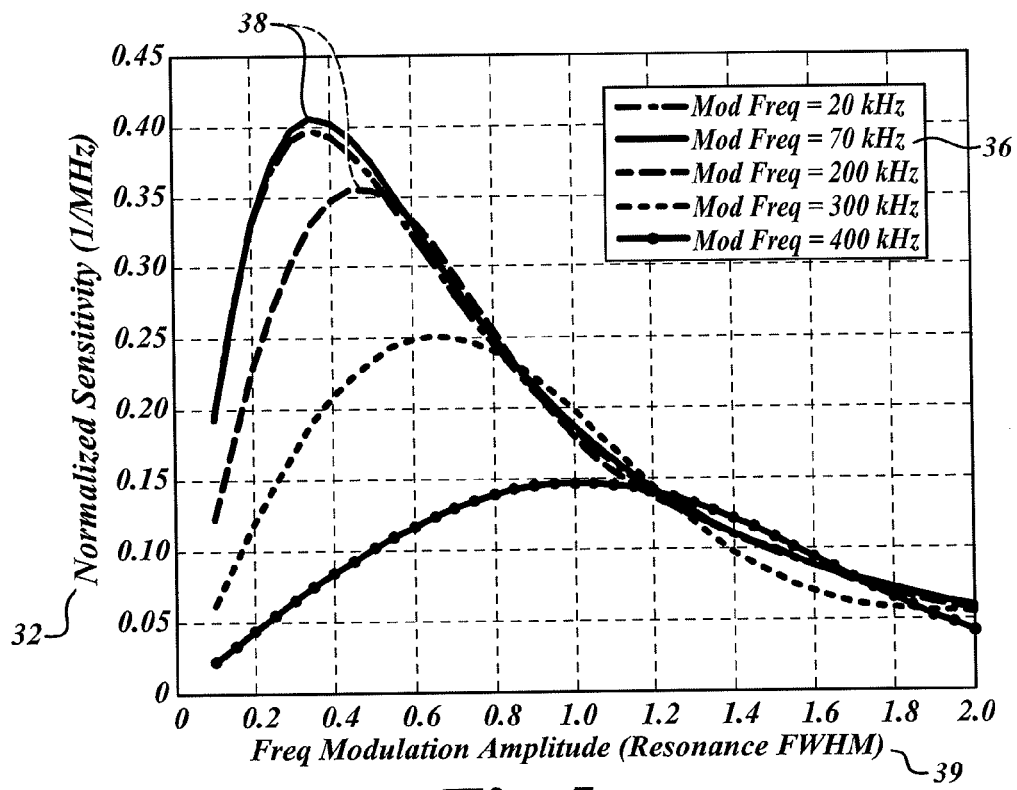
FIG. 5 is a plot of the normalized S/N sensitivity as a function of frequency modulation amplitude in units of resonance full width at half maximum (FWHM) for the same modulation frequencies of FIG. 4.

As shown in FIG. 5, the gyro sensitivities 32 are p lotted versus frequency modulation amplitude (half of peak-to-peak frequency excursion) 39 in units of resonance FWHM (shown in FIG. 2) instead of phase modulation amplitude in units of radians. For modulation frequency of 20 and 70 kHz, the maximum achievable sensitivity 38 is reached when the frequency modulation amplitude 39 is about 40% of FWHM. However, when the modulation frequency 36 increases from 200 to 300 and 400 kHz, the optimum frequency modulation amplitude 39 also increases from 45% to 65% and 100% of resonance FWHM. As a rule of thumb, optimal modulation frequency amplitudes 39 of 50% of FWHM (typically used by those skilled in the art) are not optimal, especially at high modulation frequencies. The theoretical analysis of the present invention provides a more accurate way of optimizing the input beam modulation in a broader range of parameters.

Figure 6:
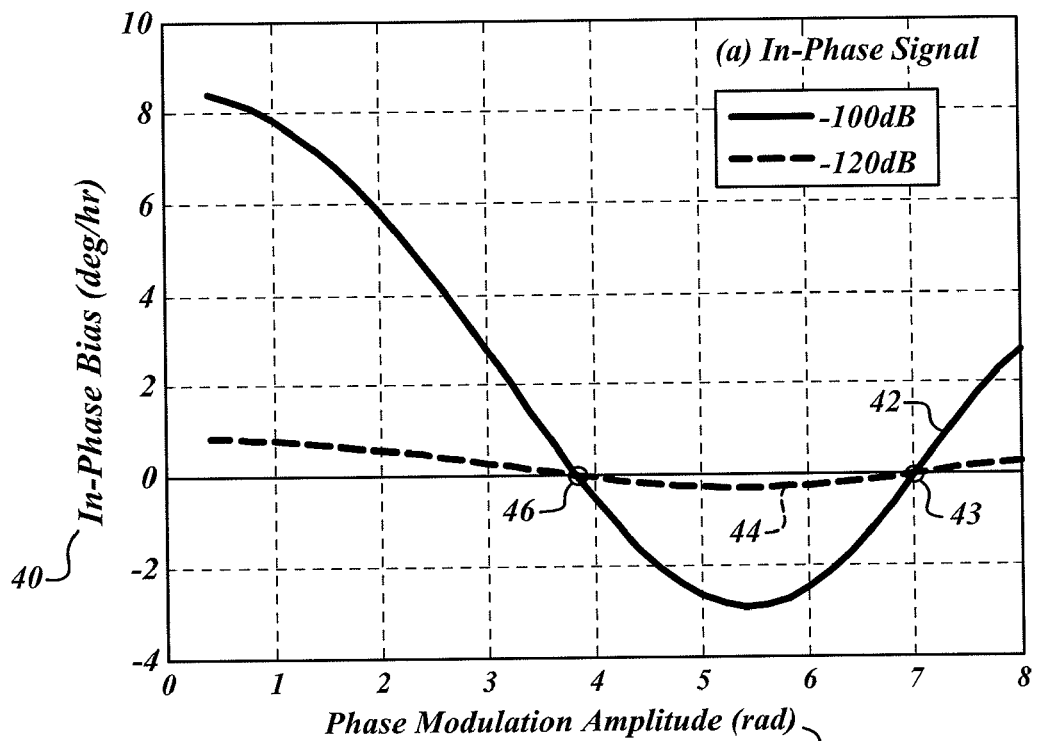
FIG. 6 is a plot of modulator polarization cross-coupling induced in-phase bias error as a function of phase modulation amplitudes for the gyro of FIG. 1.
Figure 7:
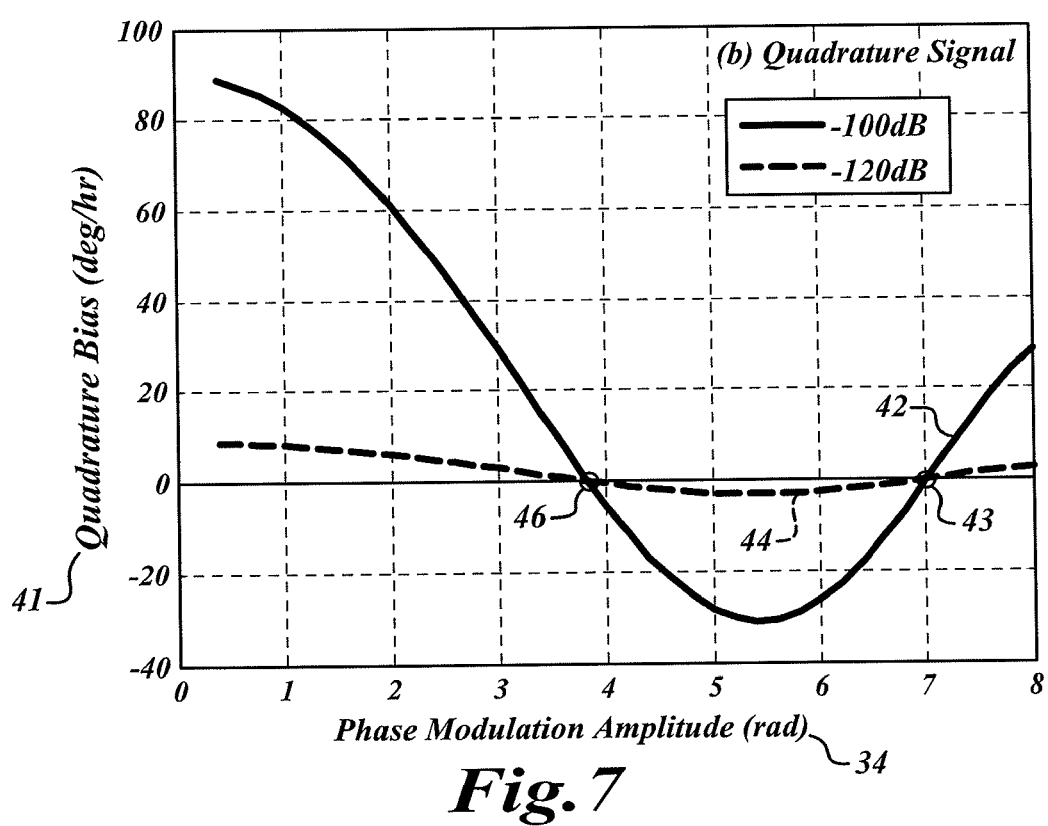
FIG. 7 is a plot of modulator polarization cross-coupling induced quadrature bias error as a function of phase modulation amplitudes for the gyro of FIG. 1.

In addition to calculating gyro sensitivity 32, the disclosed model predicts an in-phase bias error 40 and a quadrature bias error 41 produced by modulator intensity modulation due to polarization cross-coupling. As shown in FIGS. 6 and 7, respectively, the in-phase bias error 40 and the quadrature bias error 41 approach zero at phase modulation amplitudes 34 of M=3.83 and 7.02 radians. The solid lines 42 are for a −100 dB polarization cross-coupled field corresponding to $k_1 k_2 \epsilon = 10^{-5}$, and dashed lines 44 are for −120 dB cross-coupled field corresponding to $k_1 k_2 \epsilon = 10^{-6}$. The in-phase and quadrature bias error 40, 41 approach zero at phase modulation amplitudes 34 of M=3.83 and 7.02 radians independent of the modulation frequency 36. The mathematical solution for the in-phase and quadrature bias error 40, 41 to approach zero is the zero point of the first order of Bessel function $J_1(M=3.83, 7.03, \ldots)=0$. Therefore it is advantageous to select phase modulation amplitude 34 at bias nulling points 46, 48 so that the bias error caused by modulator intensity modulation is nulled even when $k_1 k_2 \epsilon$ is significant. Eliminating the bias error enables low cost modulators to be used in the RFOG 10 without sacrificing bias performance.

However, selecting phase modulation amplitude 34 at specific values, such as 3.83 and 7.02 radians, for bias reduction may degrade the gyro S/N sensitivity 32 if the modulation frequency 36 is selected arbitrarily. To maximize the gyro sensitivity 32, finding the optimal modulation frequency 36 is needed once the phase modulation amplitude 34 is set to one of the bias nulling points 46, 48. A shown in FIG. 8, for two phase modulation amplitudes 34, i.e. M=3.83 and 7.02, setting the modulation frequency 36 close to 70 or 35 kHz effectively maximizes the gyro S/N sensitivity 32.

In a resonator gyroscope with multiple input beams, backscattering in the sensing loop may cause CW and CCW lightwaves to reach the same photo detector. In this case, demodulated signal will contain noise from backscattered light if the input light modulation frequencies are identical in both directions. Therefore it is advantageous to select different modulation frequencies for CW and CCW beams. A modulation frequency separation of a few kHz is typically enough for demodulation electronics to avoid cross-talk effects between different beams. Since the sensitivity peaks (shown in FIG. 8) are relatively broad, there is very little compromise to S/N sensitivity when each input light is modulated within a few kHz of the optimal frequency in FIG. 8. The S/N sensitivity can therefore be substantially close to maximum for both CW and CCW light.

Figure 9:
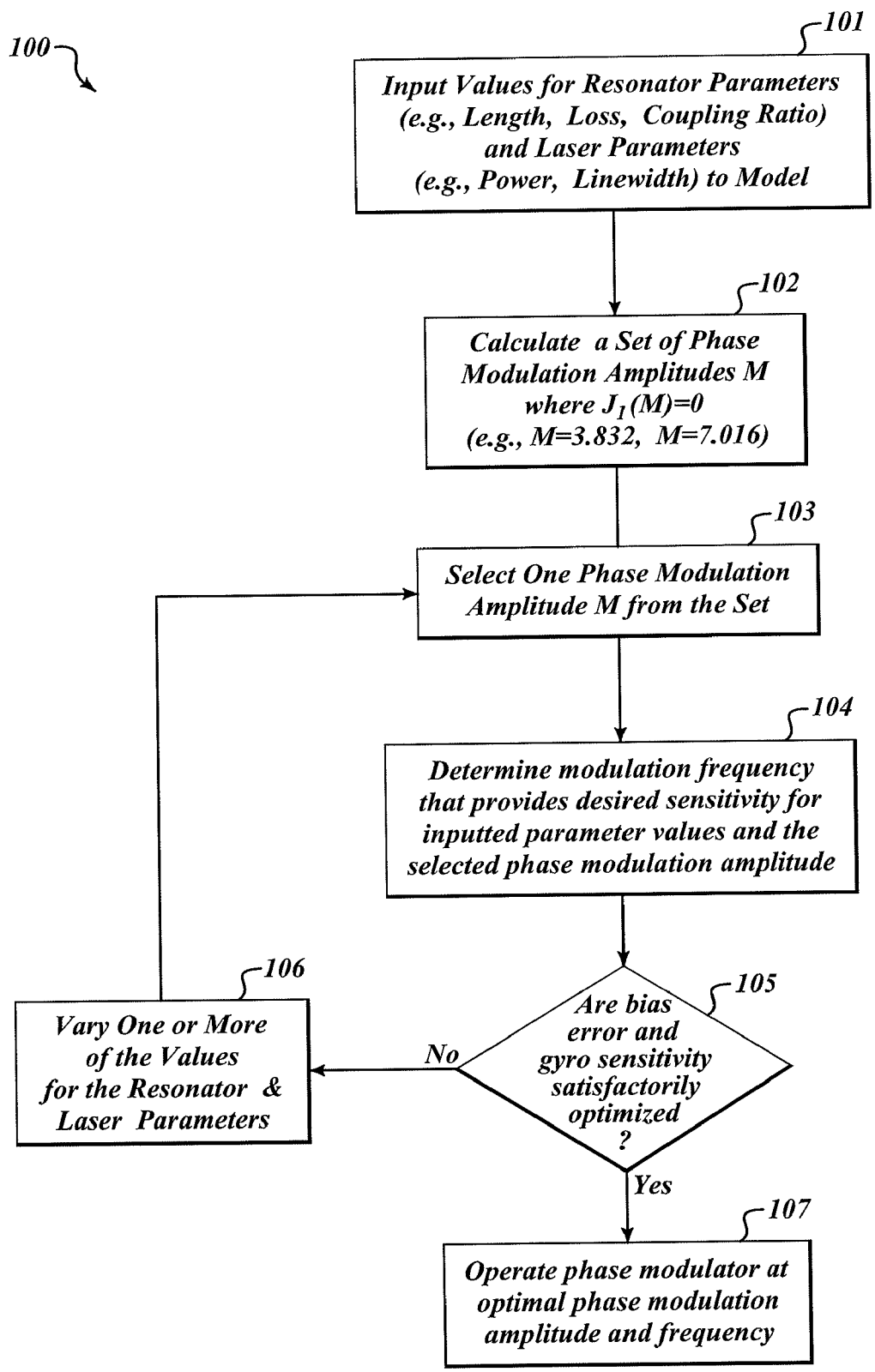
FIG. 9 is a flow chart of an example method performed by the device shown in FIG. 1 to optimize the gyro performance.

Achieving high sensitivity and low bias in the RFOG 10 of FIG. 1 is possible by selecting an optimum amplitude and frequency of modulation of an input beam received by the phase modulator 13 from the laser 11. FIG. 9 shows a method to carry out an optimization process. At a first block 101 of example method 100, the basic RFOG parameters, such as cavity length, round-trip loss, input/output coupling ratios, laser power and line width 27, are input to a mathematical model. The mathematical model is a computer program described above that relates allowable combinations of RFOG parameters to the bias and S/N sensitivity performance of the gyro.

Figure 8:
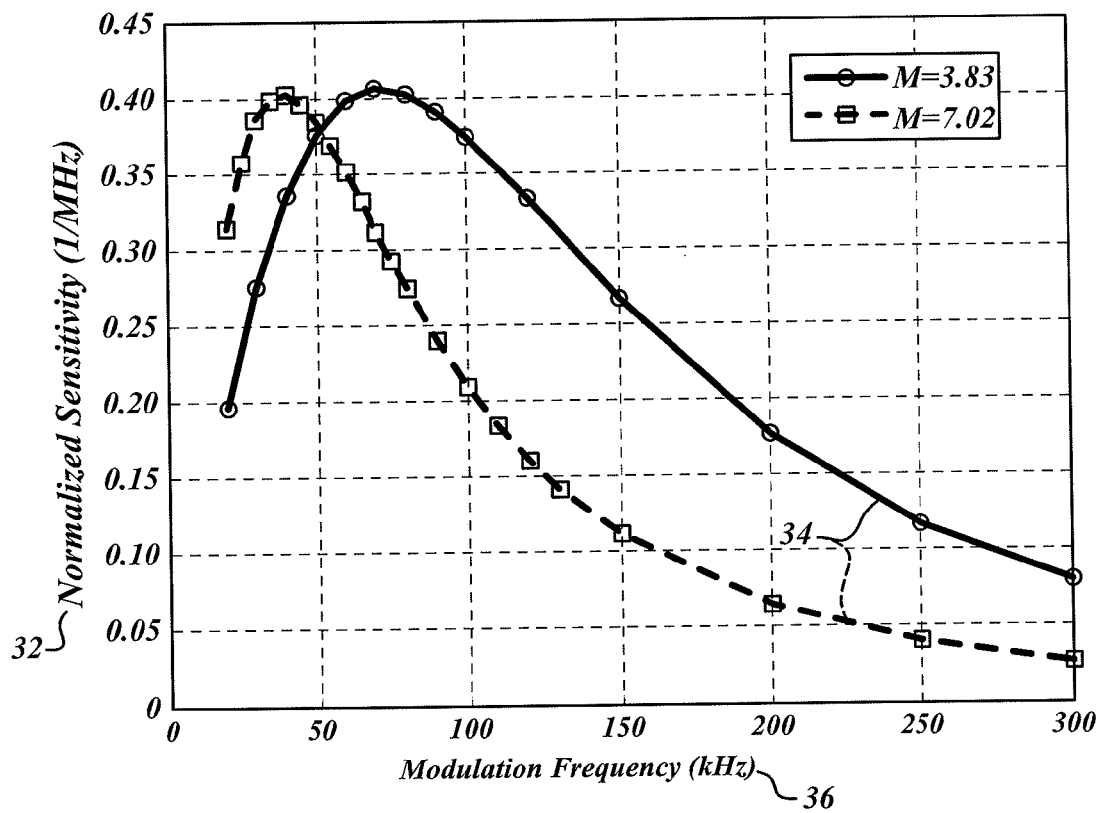
FIG. 8 is a plot of S/N sensitivity for the gyro of FIG. 1 as a function of modulation frequency for fixed phase modulation amplitudes of M=3.83 and 7.02 radians.

At a second block 102, in a calculation, a phase modulation amplitude M 34 that satisfies $J_1(M)=0$, usually starting from smallest M numbers first (e.g. 3.832), is determined. As described above, this amplitude 34 nulls the in-phase and quadrature bias error 40, 41 induced by intensity modulation due to polarization cross-coupling. There is likely more than one amplitude that satisfies the condition $J_1(M)=0$, therefore a set of possible amplitudes M results. Next at a block 103, one amplitude 34 is selected from the set of amplitudes calculated at block 102. For reasons of practical implementation, a low amplitude 34 is likely selected. Next at a block 104, the modulation frequency 36 that maximizes the desired gyro S/N sensitivity 32 is determined by calculating a response plot (as shown in FIG. 8) for the selected phase modulation amplitude of block 102 and the selected input parameter values for the mathematical model of block 101. High S/N sensitivity is generally considered desirable therefore the frequency at which the response plot reaches its peak may be selected.

Next, at a decision block 105, using the model or actual measurement results of the RFOG 10, the example method 100 determines whether the selected RFOG parameters, phase modulation amplitude and phase modulation frequency achieve the desired reduction in bias and desired sensitivity 32.

If not, next at a block 106 at least one of the gyro input parameters, e.g. input/output coupling ratio, is varied from the value originally used in the mathematical model of block 101. The mathematical model relating the RFOG parameters to its sensitivity is recalculated with the newly varied value or values. Next either the same or a different amplitude 34 is selected at block 103. A different phase modulation amplitude M 34 can be chosen that satisfies $J_1(M)=0$ in order to find a practically feasible design. Next, at block 104, response plots are updated according to the new RFOG parameters and the selected phase modulation amplitude 34 so that a new phase modulation frequency can be determined that provides the desired RFOG S/N sensitivity. Blocks 103 to 106 can be repeated as many times as necessary until the resulting RFOG design or operation achieves the desired reduction in bias and the desired gyro sensitivity 32.

Once the desired bias and sensitivity are reached, as determined at the decision block 105, at a block 106 the phase modulation amplitude and frequency values are applied to the phase modulator 13 of the RFOG 10.

Note that the selecting and optimizing process highlighted in this invention is by no means limited to occurring during the RFOG design process or though the use of modeling tools. Optimization of the modulation amplitude and frequency of the input beam can be completed during practical operation of the gyro. Servo electronics can be used to dynamically adjust the modulation of the input beam in search of the desired sensitivity and minimum bias error.

While the preferred embodiment of the invention has been illustrated and described, as noted above, many changes can The embodiments of the invention in which an exclusive property or privilege is claimed are defined as follows:

1. A method for reducing modulator intensity modulation-induced bias error in a resonator optical gyroscope, the method comprising:
   a. determining a set of phase modulation amplitudes where a Bessel function J1(M) of a sinusoidal phase modulation of an input light beam equals approximately zero, the determination based on parameters of the resonator optical gyroscope;
   b. selecting a phase modulation amplitude M from the set of phase modulation amplitudes;
   c. applying the selected phase modulation amplitude to the input light, thus reducing the intensity modulation-induced bias error;
   d. generating a response from a demodulated first harmonic signal of the resonator output light based on at least one of a plurality of gyro parameter values and the selected phase modulation amplitude;
   e. determining a phase modulation frequency that maximizes the generated response; and
   f. applying the selected phase modulation amplitude and frequency to the input light of the resonator gyro, thus reducing the intensity modulation-induced bias error and increasing the gyro rate measurement sensitivity.

2. The method of claim 1, further comprising:
   varying at least one of the plurality of gyro parameters; and repeating (c), (d) and (e).

3. The method of claim 1, wherein the phase modulation frequency is determined by the phase modulation frequency that maximizes the generated response.

4. The method of claim 1, wherein the gyro parameters include at least one of resonator parameters and laser parameters.

5. A system for sensing rotation rate, comprising:
   at least one light source;
   at least one phase modulator configured to receive a light beam from the light source, and to operate at a phase modulation amplitude that minimizes bias offset in the demodulated first harmonic signal due to polarization cross coupling;
   a resonator configured to receive a modulated light beam from the phase modulator;
   a detector configured to detect resonator output light; and
   a processor configured to:
      determine a set of phase modulation amplitudes where a Bessel function J1(M) of a sinusoidal phase modulation of an input light beam equals approximately zero, the determination based on parameters of the resonator:
      select a phase modulation amplitude M from the set of phase modulation amplitudes;
      provide the selected phase modulation amplitude to the at least one phase modulator;
      generate a response from a demodulated first harmonic signal of the resonator output light based on at least one of a plurality of resonator values and the selected phase modulation amplitude;
      determine a phase modulation frequency that maximizes the generated response: and
      provide the selected phase modulation amplitude and frequency to the at least one phase modulator.

6. The system of claim 5, wherein the phase modulator further operates at a phase modulation frequency that substantially increases gyro measurement sensitivity.

7. The system of claim 5, wherein the phase modulators for different input light operate at slightly different phase modulation frequencies that are substantially close to a frequency that maximize sensitivity.

8. A method for reducing modulator intensity modulation-induced bias error and increasing measurement sensitivity in a resonator optical gyroscope, the method comprising:
   a. determining a set of phase modulation amplitudes where a Bessel function J1(M) of a sinusoidal phase modulation of an input light beam equals approximately zero, the determination based on parameters of the resonator optical gyroscope;
   b. selecting a phase modulation amplitude M from the set of phase modulation amplitudes;
   c. generating a response from a demodulated first harmonic signal of the resonator output light based on at lease one of resonator parameters and laser parameters and the selected phase modulation amplitude;
   d. determining a phase modulation frequency that maximizes the generated response;
   e. varying at least one of the plurality of resonator parameters and laser parameters;
   f. repeating (b), (c), and (d), as desired, to further optimize the phase modulation frequency; and
   g. applying the selected phase modulation amplitude and frequency to the input light, thus reducing the modulator intensity modulation-induced bias error and increasing gyro measurement sensitivity.

* * * * *